United States Patent [19]

Ohno et al.

[11] Patent Number: 5,469,296
[45] Date of Patent: Nov. 21, 1995

[54] CONTROL DEVICE FOR ANTIGLARE MIRROR

[75] Inventors: Kouichi Ohno; Hideki Miyatake; Yutaka Yoshida, all of Aichi, Japan

[73] Assignee: Kabushiki Kaisha Tokai Rika Denki Seisakusho, Aichi, Japan

[21] Appl. No.: 218,640

[22] Filed: Mar. 28, 1994

[30] Foreign Application Priority Data

Mar. 29, 1993 [JP] Japan .................... 5-069832

[51] Int. Cl.$^6$ .................... G02F 1/15; G02B 5/08
[52] U.S. Cl. .................... 359/603; 359/265; 359/604
[58] Field of Search .................... 359/603, 267, 359/602, 604, 270, 275, 265; 345/105

[56] References Cited

U.S. PATENT DOCUMENTS

| | | | |
|---|---|---|---|
| 4,896,030 | 1/1990 | Miyaji | 250/206 |
| 4,917,477 | 4/1990 | Bechtel et al. | 359/267 |
| 5,220,317 | 6/1994 | Lynman et al. | 345/105 |

Primary Examiner—Paul M. Dzierzynski
Assistant Examiner—Mohammad Y. Sikder
Attorney, Agent, or Firm—Finnegan, Henderson, Farabow, Garrett & Dunner

[57] ABSTRACT

A control device for controlling an antiglare mirror in vehicles. The inner mirror, which has a gel-type EC cell, reduces its mirror reflectivity as the positive voltage applied thereto increases. A rear light sensor receives the light from behind through the inner mirror. A comparison decision circuit detects the intensity of the light from behind in accordance with the light receiving state of the rear light sensor and an ambient light sensor. A driving circuit applies a positive voltage to the EC cell of the inner mirror so that the light from behind has a predetermined intensity level. A control circuit supplies a negative or positive voltage to outer mirrors in accordance with the positive voltage applied to the inner mirror. The outer mirrors enhances their mirror reflectivity as the negative voltage level applied becomes high and reduces their mirror reflectivity as the positive voltage level applied becomes high.

5 Claims, 6 Drawing Sheets

CONTROL DEVICE FOR ANTIGLARE MIRROR

BACKGROUND OF THE INVENTION

1. Field of the invention

The present invention relates to a control device for an antiglare mirror for use in vehicles.

2. Description of Related Art

Antiglare mirrors for use in vehicles using a gel-type EC cell and a thin-film type EC cell have been conventionally proposed. The gel-type EC cell, which is formed of gel material such as biologen compound sealed between glass substrates, uses coloring due to oxidation/reduction of the biologen compound when a voltage is applied to the glass substrates. The thin-film type EC cell, which is formed of a transient metal oxide such as $WO_3$ vapor-deposited on the glass substrates, uses coloring due to injection of hydrogen and metal ions into and emission thereof when a voltage is applied to the glass substrates. Therefore, whether the antiglare mirror uses the gel-type EC or the thin-film type EC cell, as the applied voltage becomes high, its mirror reflectivity decreases due to the coloring of the EC cell, and when the applied voltage is removed, it is restored to its initial value and thereafter increases.

The gel-type EC, which has a simple structure in which the gel material is sealed between two glass substrates, is high in productivity. But it is not suitable to a spherical mirror which must be formed by bending the glass substrate. For this reason, actually, only a plane mirror has been formed using the gel type EC cell. On the other hand, although the thin-film type EC cell, which has the structure of vapor-deposition to the glass substrates, requires great initial investment for e.g. a vapor-deposition apparatus, it is suitable to fabrication of the spherical mirror as well as the plane mirror. Thus, where both inner mirror and outer mirror are plane mirrors, it is desirable to fabricate all the mirrors using the gel type EC cell. But in a general case where the outer mirror is a spherical mirror, it is necessary to use the gel type EC cell as an inner mirror and the thin-film type EC cell as an outer mirror.

However, the gel-type EC cell is a system of controlling its mirror reflectivity by application of a positive voltage whereas the thin-film type EC cell is a system of controlling its mirror reflectivity by application of both positive and negative voltages. Therefore, when the gel-type EC cell is used as the inner mirror and the thin-film EC cell is used as the outer mirror, it is impossible to control the mirror reflectivity of the outer mirror by a driving circuit for the inner mirror. In this case, the mirror reflectivity of the outer mirror must be controlled separately from the control for the inner mirror. As a result, the entire structure becomes complicated increasing production cost, and the antiglare states of the inner mirror and outer mirror may not be synchronized with each other.

SUMMARY OF THE INVENTION

The present invention has been completed in view of the above circumstances. Its object is to provide a control device for an antiglare mirror for vehicles which has an overall simplified configuration and synchronizes the antiglare states of an inner mirror and an outer mirror.

The present invention includes a driving circuit for producing a voltage signal corresponding to the intensity of light projected from behind; an inner mirror having a gel-type EC cell which is provided so that a positive voltage is applied in accordance with the voltage signal from the driving circuit and which decreases its mirror reflectivity with a rise in the applied positive voltage; a control circuit for producing a control voltage which is a predetermined negative voltage when the positive voltage applied to the EC cell of the inner mirror is not larger than a preset voltage and a predetermined positive voltage when it is not smaller than the preset voltage; and an outer mirror having a thin-film type EC cell which is provided so that the control voltage from the control circuit is applied and which .increases its mirror reflectivity with a rise in the applied negative voltage and decreases its mirror reflectivity with a rise in the applied positive voltage.

The present invention includes a driving circuit for producing a voltage signal corresponding to the intensity of light projected from behind; an inner mirror having a gel-type EC cell which is provided so that a positive voltage is applied in accordance with the voltage signal from the driving circuit and which decreases its mirror reflectivity with a rise in the applied positive voltage; a control circuit for producing a control voltage which is a predetermined negative voltage when the positive voltage to the EC cell of the inner mirror is not larger than a preset voltage and a positive voltage proportional to the applied positive voltage when it is not smaller than the preset voltage; and an outer mirror having a thin-film type EC cell which is provided so that the control voltage from the control circuit is applied and which increases its mirror reflectivity with a rise in the applied negative voltage and decreases its mirror reflectivity with a rise in the applied positive voltage.

The present invention includes a driving circuit for producing a voltage signal corresponding to the intensity of light projected from behind; an inner mirror having a gel-type EC cell which is provided so that a positive voltage is applied in accordance with the voltage signal from the driving circuit and which decreases its mirror reflectivity with a rise in the applied positive voltage; a control circuit for producing a control voltage which is a predetermined negative voltage when the positive voltage applied to the EC cell of the inner mirror is not larger than a preset voltage and the applied positive voltage when it is not smaller than the preset voltage; and an outer mirror having a thin-film type EC cell which is provided so that the control voltage from the control circuit is applied and which increases its mirror reflectivity with a rise in the applied negative voltage and decreases its mirror reflectivity with a rise in the applied positive voltage.

The present invention includes a driving circuit for producing a voltage signal corresponding to the intensity of light projected from behind; an inner mirror having a gel-type EC cell which is provided so that a positive voltage is applied in accordance with the voltage signal from the driving circuit and which decreases its mirror reflectivity with a rise in the applied positive voltage; a control circuit for producing a control voltage which is proportional to the positive voltage applied to the EC cell of the inner mirror so that it is a predetermined negative voltage at the minimum applied positive voltage and a predetermined positive voltage at the maximum applied positive voltage; and an outer mirror having a thin-film type EC cell which is provided so that the control voltage from the control circuit is applied and which increases its mirror reflectivity with a rise in the applied negative voltage and decreases its mirror reflectivity with a rise in the applied positive voltage.

According to the control device for an antiglare mirror for vehicles according to the present invention, when light is projected from behind, a driving circuit produces a voltage signal corresponding to the intensity of the projected light. Then, since a positive voltage corresponding to the input voltage signal is applied to the gel type EC cell of an inner mirror, the inner mirror decreases its mirror reflectivity with a rise in the applied positive voltage. Thus, when the intensity of the light from behind is great, the inner mirror falls in an antiglare state.

On the other hand, a control circuit, when the mirror reflectivity of the inner mirror is high since the positive voltage applied to the EC cell of the inner mirror is not larger than a preset voltage, supplies a control voltage of a predetermined negative voltage to the EC cell of an outer mirror to increase its mirror reflectivity. Further, the control circuit, when the mirror reflectivity of the inner mirror is low since the positive voltage applied to the EC cell of the inner mirror is not smaller than a preset voltage, supplies a predetermined positive control voltage to the EC cell of the outer mirror to decrease its mirror reflectivity. Accordingly, when the intensity of the light from behind becomes high, the mirror reflectivity of the outer mirror as well as that of the inner mirror decreases.

According to the control device for an antiglare mirror for vehicles of the present invention, a control circuit, when the mirror reflectivity of the inner mirror is high since the positive voltage applied to the EC cell of the inner mirror is not larger than a preset voltage, supplies a predetermined negative control voltage to the EC cell of an outer mirror to increase its mirror reflectivity. Further, the control circuit, when the mirror reflectivity of the inner mirror is low since the positive voltage applied to the EC cell of the inner mirror is not smaller than a preset voltage, supplies a positive control voltage proportional to the applied positive voltage. Accordingly, as the intensity of the light from behind increases, the mirror reflectivity of the outer mirror as well as that of the inner mirror decreases.

According to the control device for an antiglare mirror for vehicles of the present invention, a control circuit, when the mirror reflectivity of the inner mirror is high since the positive voltage applied to the EC cell of the inner mirror is not larger than a preset voltage, supplies a predetermined negative control voltage to the EC cell of an outer mirror to increase its mirror reflectivity. Further, the control circuit, when the mirror reflectivity of the inner mirror is low since the positive voltage applied to the EC cell of the inner mirror is not smaller than a preset voltage, supplies the applied positive voltage as it is as a control voltage to the EC cell of the outer mirror. Accordingly, as the intensity of the light from behind increases, the mirror reflectivity of the outer mirror as well as that of the inner mirror decreases.

According to the control device for an antiglare mirror for vehicles of the present invention, the control circuit supplies, to the EC cell of the outer mirror, a control voltage proportional to the positive voltage applied to the EC cell of the inner mirror so that it is a predetermined negative voltage at a minimum applied positive voltage and a predetermined positive voltage at a maximum applied positive voltage. Accordingly, as the intensity of light from behind increases, the mirror reflectivity of the outer mirror as well as that of the inner mirror decreases.

DETAILED DESCRIPTION OF THE PREFERRED EMBODIMENTS

Now referring to FIGS. 1 to 7, an explanation will be given of a first embodiment of the present invention. FIG. 2 is a schematic view of a motor car or vehicle. As seen from FIG. 2, an inner mirror 1 is arranged within a vehicle room and outer mirrors 4 and 5 are arranged outside driver and passenger side doors 2 and 3.

Figure 1:
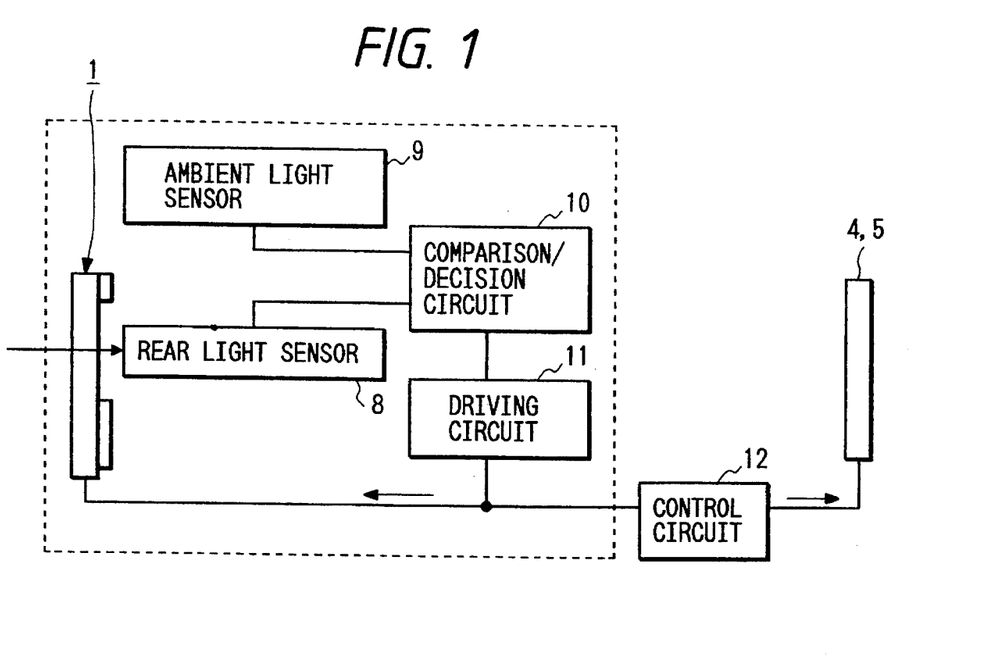
FIG. 1 is a schematic view showing an antiglare apparatus incorporating the present invention.
Figure 2:
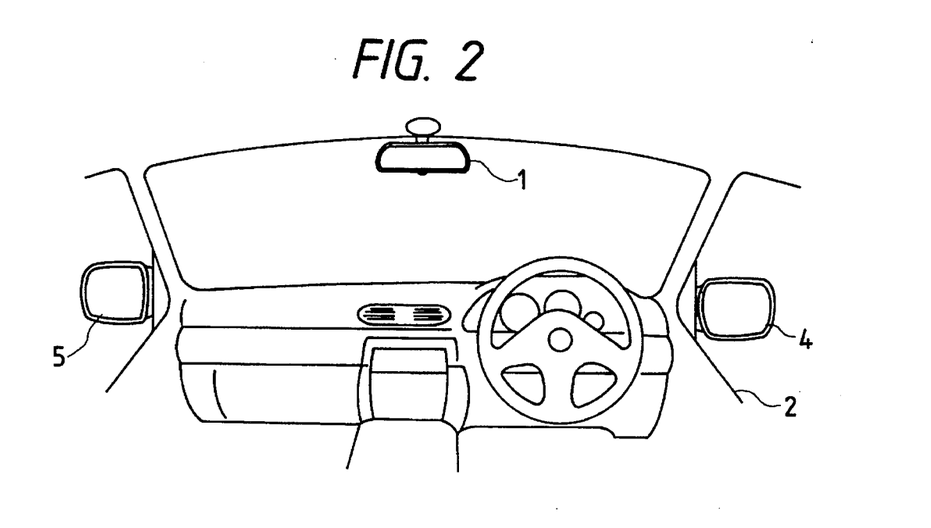
FIG. 2 is a schematic view of a vehicle showing the arrangement of mirrors.
Figure 3:
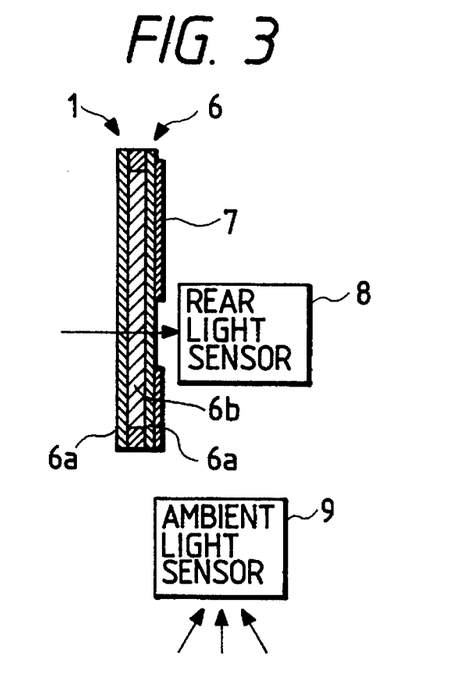
FIG. 3 is a schematic view showing the configuration of an inner mirror.

FIG. 1 shows the entire electrical configuration. In FIG. 1, an inner mirror 1 is an automatic antiglare mirror using a gel type EC cell. As shown in FIG. 3, the inner mirror 1 is composed of an EC cell 6 having a gel material 6b such as bilogen compound sealed between glass substrates 6a, 6a and a mirror 7 attached to the back side of the EC cell. A predetermined portion of the mirror 7 is removed and a back or rear light sensor 8 is arranged at a position on the back side of the inner mirror 1 corresponding to the removed portion. The rear light sensor 8, therefore, is set to receive the light from back of the vehicle through the EC cell 6. Further, an ambient light sensor 9 for detecting ambient brightness is arranged in the vicinity of the inner mirror 1.

Figure 4A:
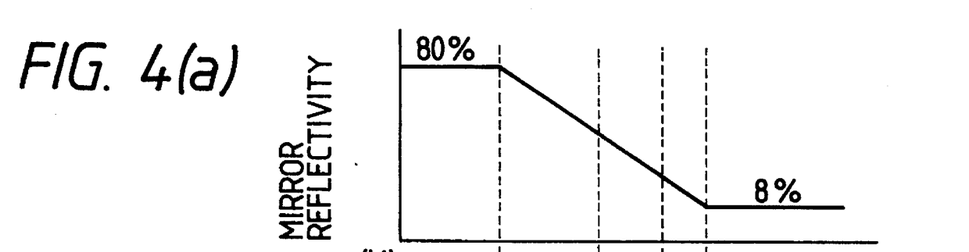
FIGS. 4(a) and (b) are graphs showing the relationship between a pulse signal applied to the inner mirror and the mirror reflectivity.
Figure 4B:
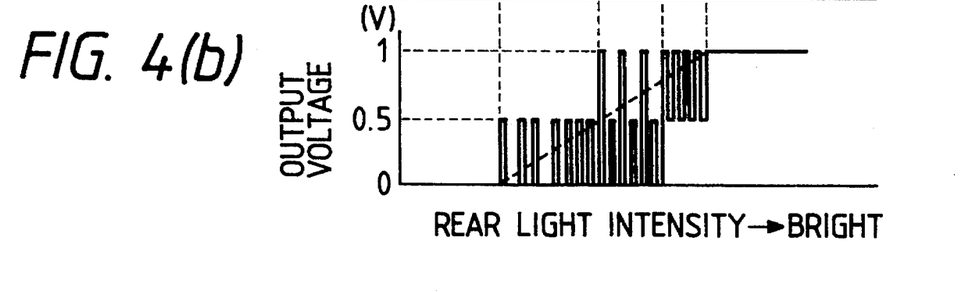

In FIG. 1, a comparison/decision circuit 10 compares the light receiving levels in the rear light sensor 8 and the ambient light sensor 9, and on the basis of the comparison result, decides the intensity of the light projected from the rear of the vehicle. A driver circuit 11, on the basis of the decision result by the comparison/decision circuit 10, supplies a pulse signal to the EC cell 6 of the inner mirror 1. The pulse signal, as shown in FIG. 4(b), has an output timing and signal level set in accordance with the intensity of the light from the rear. In this case, the EC cell 6 functions as a capacitor. Thus, when the pulse signal is applied to the EC cell 6, in accordance with the pulse signal, an analog voltage as indicated by a broken line will be applied.

Figure 5:
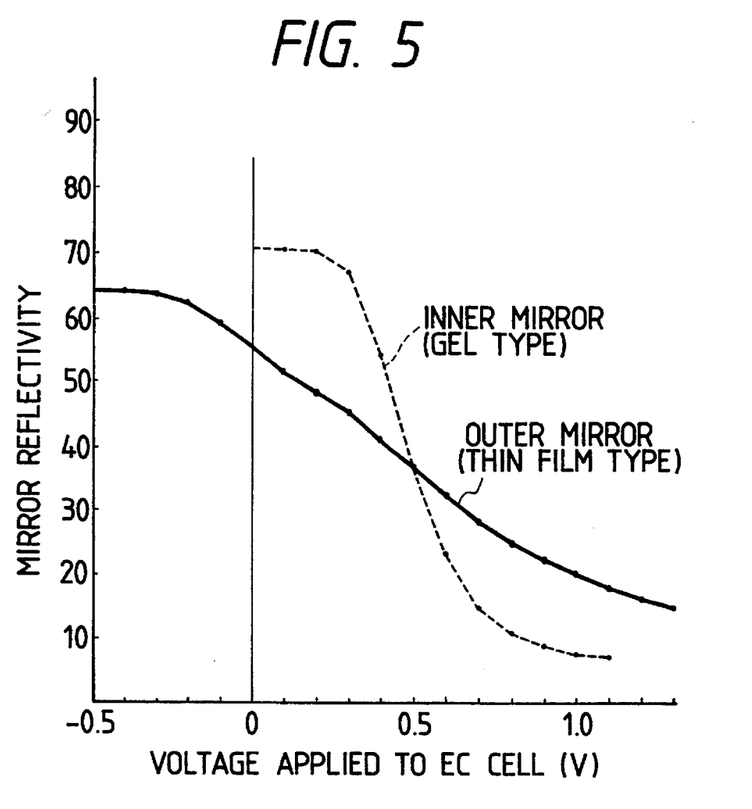
FIG. 5 is a graph showing the relationship between the voltage applied to a gel-type and thin-film type mirror and their mirror reflectivity.

Because of oxidation of the biologen compound due to the voltage applied to the EC cell 6, the inner mirror 1 having the above structure is colored so that its light transmissivity decreases. In accordance with a decrease in the light transmissivity, as shown in FIG. 4(a), the mirror reflectivity decreases (FIG. 5). In short, in the inner mirror 1, as the voltage applied to the EC cell 6 increases, the light transmissivity of the EC cell 6 decreases and so the mirror reflectivity also decreases. As a result that the light transmissivity of the EC cell 6 decreases in accordance with the intensity of the light from the rear, feedback control is carried out so that the mirror reflectivity of the inner mirror 1 reaches a predetermined value.

Again, in FIG. 1, in this embodiment, a control circuit 12 applies a positive voltage to the EC cell 6 of the inner mirror 1, and also applies a control voltage to the left and right outer mirrors 4 and 5 in accordance with the applied positive voltage.

(1) In the range of the applied positive voltage of 0.5 V or less, a control voltage of −0.5 V is outputted.

(2) In the ascending range of the applied positive voltage from 0.5 V to 0.6 V, a control voltage of −0.5 V is outputted.

(3) In the range of the applied positive voltage of 0.6 or more, a control voltage of 1.3 V is outputted.

(4) In the descending range from 0.6 V to 0.5 V, a control voltage of 1.3 V is outputted.

Figure 6:
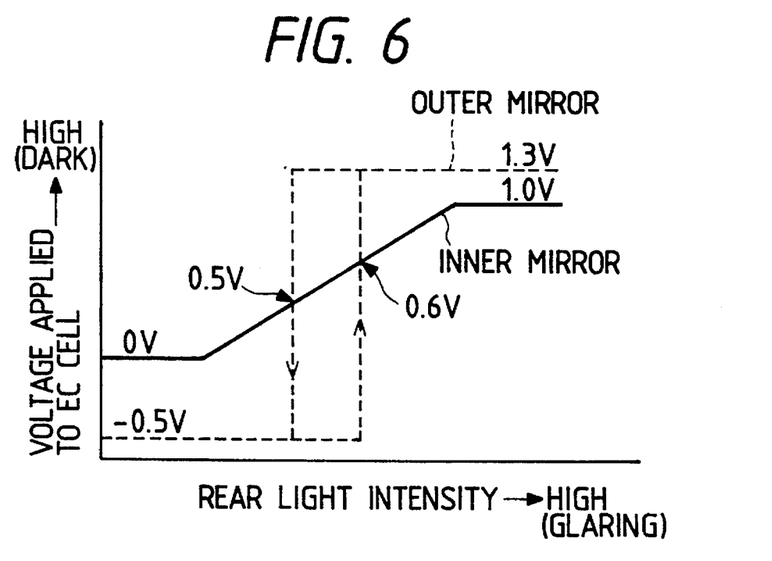
FIG. 6 is a graph showing the relationship between the voltages applied to an inner mirror and outer mirrors.

Thus, the relationship between the positive voltage applied to the EC cell 6 of the inner mirror 1 and the control voltage applied to the outer mirrors is such as shown in FIG. 6. It should be noted that hysteresis is set in the range between 0.5 V and 0.6 V of the positive voltage applied to the inner mirror 1 in order to prevent the control voltage from being chattered to fall in an unstable state owing to changes in the positive voltage in the inner mirror 1.

On the other hand, the left outer mirror 4 and the right outer mirror 5 are thin-film type mirrors in which $WO_3$ is vacuum-deposited to the glass substrates. In accordance with the voltage applied to the EC cell 6 of the inner mirror 1, the mirror reflectivity of each of the left and right outer mirrors 4 and 5 is controlled as indicated by a solid line in FIG. 5. As seen from FIG. 5, as the negative voltage applied to the EC cell 6 becomes high, the mirror reflectivity is increased whereas as the positive voltage applied to the EC cell becomes high, the mirror reflectivity is decreased.

In FIG. 1, the inner mirror 1, rear light sensor 8, ambient light sensor 9, comparison decision circuit 10 and driving circuit 11 are constructed of commercially available products, respectively.

Figure 7:
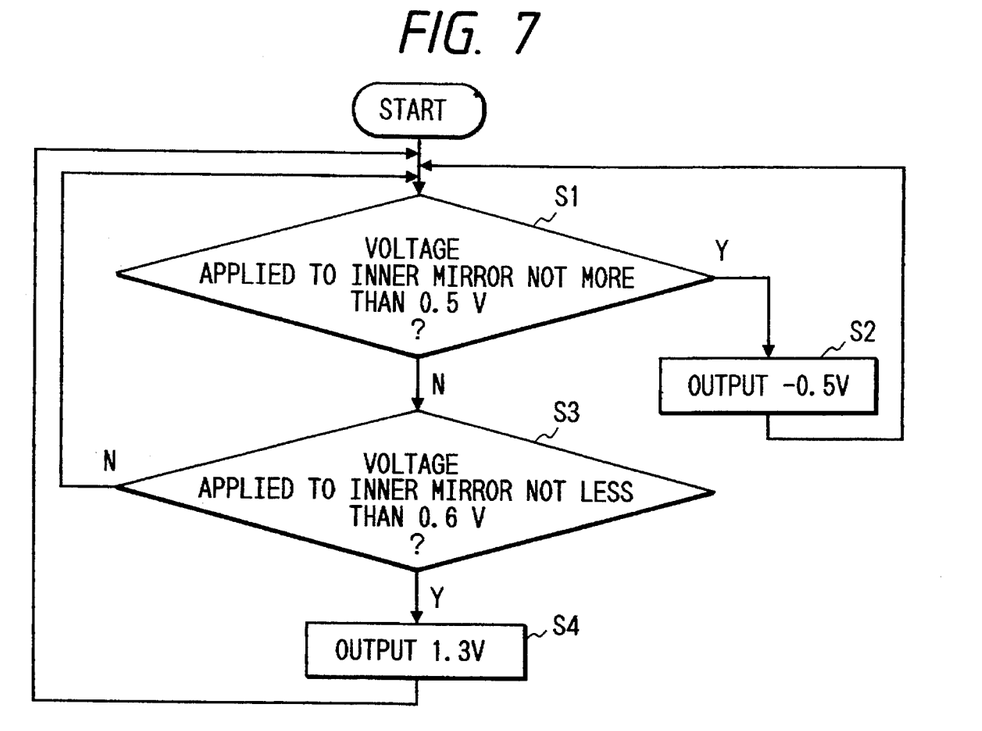
FIG. 7 is a flowchart showing the operation of a control circuit for a first embodiment of the present invention.

The operation of the above configuration will be explained. FIG. 7 shows the control performed by the system shown in FIG. 1 when light from the head light of a following vehicle is projected onto the inner mirror of a vehicle at issue during night driving. Referring to the elements of FIG. 1, when the following vehicle is not running or far away, since the rear light sensor 8 and ambient light sensor 9 have substantially the same light receiving level, the comparison decision circuit 10 decides that the intensity of the light from behind is low. Then, the driving circuit 11 supplies no pulse signal to the EC cell 6 of the inner mirror 1 so that the positive voltage applied to the EC cell 6 is 0 V. In this case, the mirror reflectivity of the inner mirror is high. Thus, a driver can recognize the rear situation by looking through the inner mirror which has high mirror reflectivity.

Then, as shown by the flowchart in FIG. 7 and the system of FIG. 1, the positive voltage applied to the EC cell 6 of the inner mirror 1 is not larger than 0.5 V (Step S1), the control circuit 12 applies −0.5 V to the outer mirrors 4 and 5 (Step S2). As a result, the left and right outer mirrors 4 and 5 lose color to increase their mirror reflectivity. Thus, the driver can recognize the rear situation through the left and right outer mirrors 4 and 5 each of which has high mirror reflectivity.

When the following vehicle with a head light setting to a high beam approaches the vehicle at issue, the light from the head light of the following vehicle is projected onto the inner mirror 1. Then, since the intensity of the light projected on the inner mirror 1 is high, the driving circuit 11 for the inner mirror 1 supplies, to the EC cell 6 of the inner mirror 1, the pulse signal corresponding to the intensity of the rear light. Thus, the positive voltage applied to the EC cell 6 of the inner mirror 1 is increased and the mirror reflectivity of the inner mirror 1 is reduced correspondingly. Accordingly, the driver can recognize the situation of the following vehicle through the inner mirror with the reduced mirror reflectivity without being dazzled by the light from the head light of the following vehicle.

On the other hand, when the voltage applied to the EC cell 6 of the inner mirror 1 increases to 0.6 V or more as the intensity of the light from behind increases, the control circuit 12 advances from step S3 to step S4 (see FIG. 7) to supply 1.3 V to the EC cells of the left and right outer mirrors 4 and 5. Then, the outer mirrors 4 and 5 gain color to reduce their mirror reflectivity. As a result, the driver can recognize the situation of the following vehicle through the left and right outer mirrors 4 and 5 with the reduced mirror reflectivity without being dazzled by the light from the head light of the following vehicle.

In accordance with the above configuration, the control circuit 12 converts the positive voltage applied to the gel type EC cell 6 of the inner mirror 1 into the control voltage changing from positive to negative and supplies the converted control voltage to the left and right outer mirrors 4 and 5 having the thin-film type EC cells. Thus, the control circuit 12 can control the antiglare state of the left and right outer mirrors 4 and 5 having the thin-film type EC cells using that of the inner mirror 1 with the gel type EC cell. Unlike the prior art in which the antiglare state of the outer mirrors having thin-film type EC cells must be controlled separately from that of the inner mirror having a gel type EC cell, this embodiment permits the entire configuration to be simplified and the antiglare states of the inner mirror 1 and the left and right outer mirrors 4, 5 to be synchronized.

Figure 8:
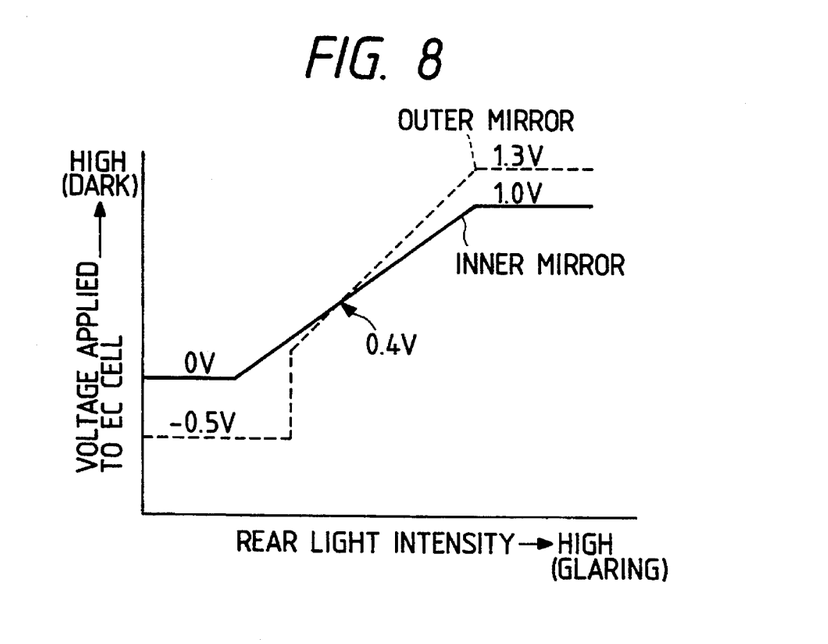
FIG. 8 is a graph showing the relationship between the voltage applied to an EC cell and the light intensity according to a second embodiment of the present invention.
Figure 9:
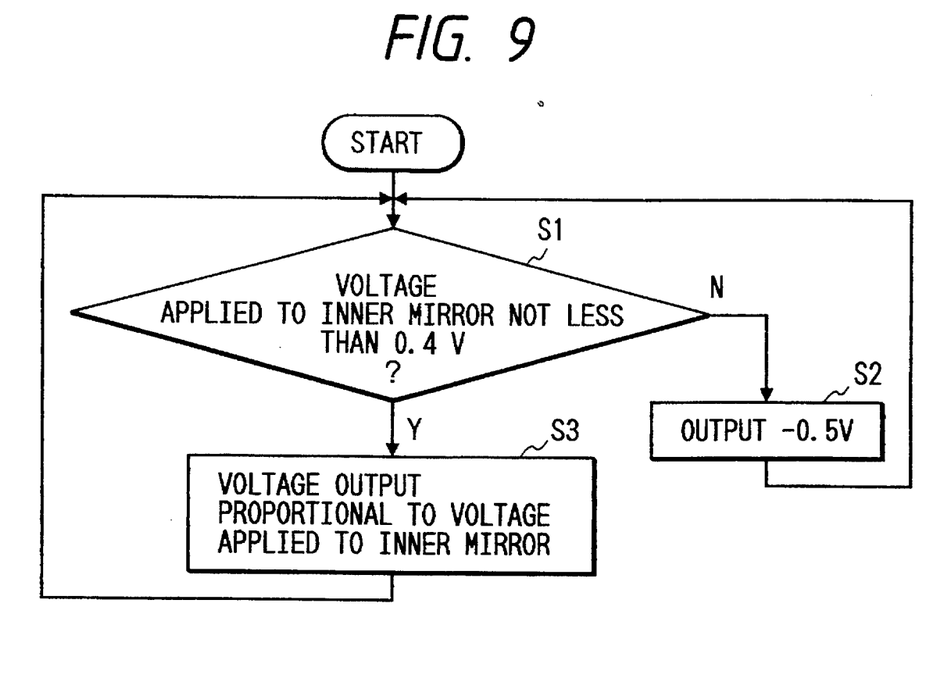
FIG. 9 is a flowchart showing the operation of a control circuit for a second embodiment of the present invention.

FIGS. 8 and 9 show the second embodiment of the present invention. Its basic configuration is different from that of the first embodiment in only the control by the control circuit 12. Namely, the control circuit 12 produces the following voltages in accordance with the positive voltage applied to the EC cell 6 of the inner mirror 1.

(1) In the range of the positive voltage of 0.4 V or less applied to the inner mirror 1, a control voltage of −0.5 V is outputted.

(2) In the positive voltage of 0.4 V or more applied to the inner mirror 1, a control voltage resulting from the amplification of the applied positive voltage is outputted. The relationship between the positive voltage x applied to the inner mirror 1 and the control voltage y can be expressed by $y = -0.2x + 1.5$.

Thus, the relationship between the positive voltage applied to the EC cell 6 of the inner mirror 1 and the control voltage from the control 12 is such as shown in FIG. 8. The control operation by the control circuit 12 when the intensity of the light from the head light of a following vehicle during night driving is increased is such as shown in FIG. 9.

Figure 10:
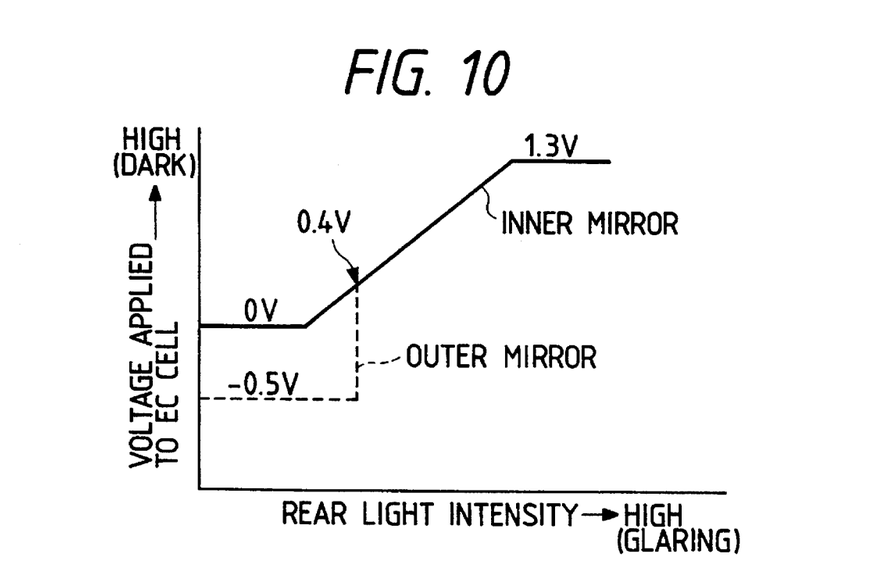
FIG. 10 is a graph showing the relationship between the voltage applied to an EC cell and the light intensity according to a third embodiment of the present invention.
Figure 11:
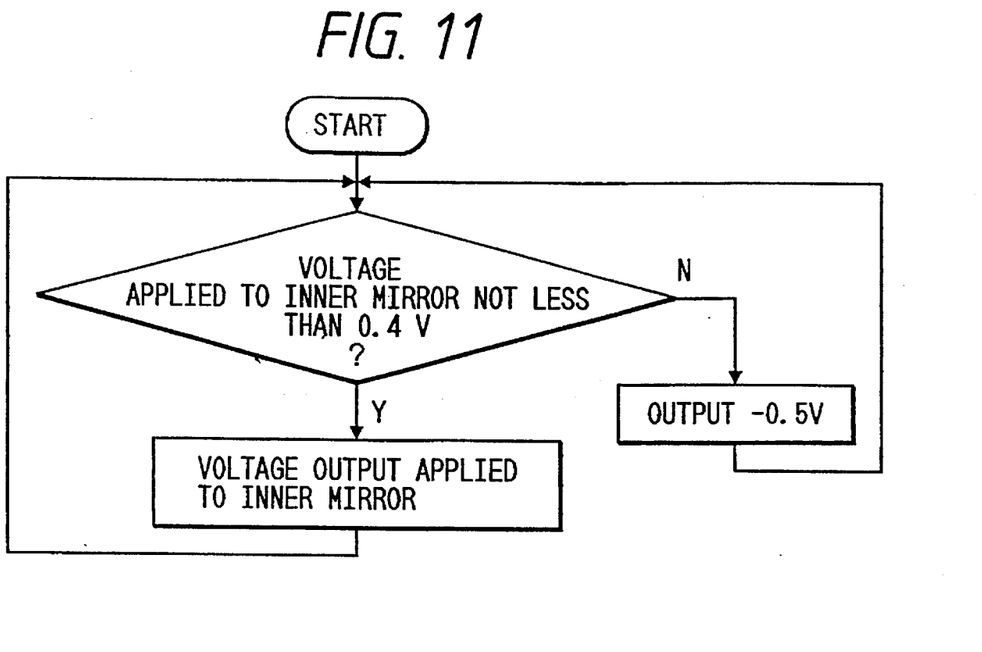
FIG. 11 is a flowchart showing the operation of the control circuit for a third embodiment of the present invention.

FIGS. 10 and 11 show the third embodiment of the present invention. In this embodiment, the control circuit 12 produces the following voltages in accordance with the positive voltage applied to the EC cell 6 of the inner mirror 1.

(1) In the range of the positive voltage of 0.4 V or less applied to the inner mirror 1, a control voltage of −0.5 V is outputted.

(2) In the positive voltage of 0.5 V or more applied to the inner mirror 1, the applied positive voltage is outputted as a control voltage as it is.

Thus, the relationship between the positive voltage applied to the EC cell 6 of the inner mirror 1 and the control voltage from the control 12 is such as shown in FIG. 10. The control operation by the control circuit 12 when the intensity of the light from the head light of a following vehicle during night driving is increased is such as shown in FIG. 11.

Figure 12:
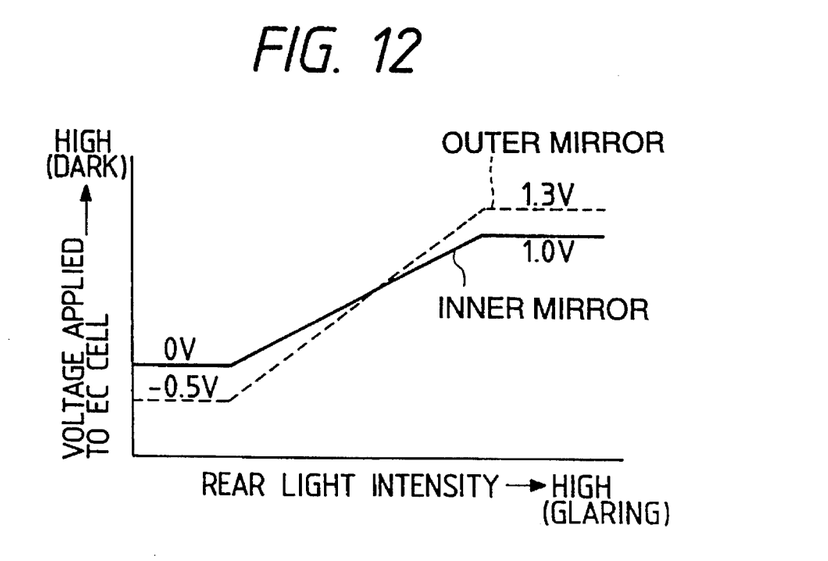
FIG. 12 is a graph showing the relationship between the voltage applied to an EC cell and the light intensity according to a fourth embodiment of the present invention.

FIG. 12 shows the fourth embodiment. In this embodiment, the control circuit 12 produces the following voltages in accordance with the positive voltage applied to the EC cell 6 of the inner mirror 1.

(1) The control voltage proportional to the positive voltage applied to the inner mirror 1 is produced in such a manner that the control voltage is −0.5 V when the applied positive voltage is 0 V and 1.3 V when the applied positive voltage is 1.0 V. In this case, the relationship between the positive voltage applied to the inner mirror 1 and the control voltage y can be expressed by y=1.3x−0.5.

Thus, the relationship between the positive voltage applied to the EC cell 6 of the inner mirror 1 is such as shown in FIG. 12.

In the second to fourth embodiments also, the antiglare state of the left and right outer mirrors 4 and 5 having thin-film type EC cells can be controlled in accordance with that of the inner mirror 1 having a gel-type EC cell 6. Like the first embodiment, these embodiments, therefore, permit the entire configuration to be simplified and the antiglare states of the inner mirror 1 and the left and right outer mirrors 4, 5 to be synchronized.

In each of the respective embodiments, although the control circuit 12 was constructed so as to supply the control voltage to the EC cells of the left and right outer mirrors 4 and 5 in accordance with the positive voltage applied to the EC cell 6 of the inner mirror 1, in place of this, it may be constructed so as to output the control voltage on the basis of the comparison result in the comparison/decision circuit 10 for the inner mirror 1.

Further, although the inner mirror 1 was so feedback-controlled that the light from behind has a predetermined level, a light sensor for sensing the light from behind may be provided separately from the inner mirror 1 to supply the control voltage to the left and right outer mirrors 4 and 5 in accordance with the intensity of the light from behind.

The driving circuit 11 may produce an analog signal in place of the pulse signal in accordance with the intensity of the light from behind.

As apparent from the above explanation hitherto made, in the control device for an antiglare mirror for use in vehicles according to the present invention, a control circuit controls the antiglare states of the outer mirrors having thin-film type EC cells using the antiglare state of the inner mirror having a gel-type EC cell. The present invention permits the entire configuration of the control device to be simplified and the antiglare states of the inner mirror and outer mirrors to be synchronized.

What is claimed is:

1. A control device for controlling the reflectivity of mirrors in a vehicle comprising:

an inner mirror having a gel-type electrochromic (EC) cell responsive to a voltage signal greater than a reference voltage to decrease the reflectivity of the inner mirror;

an outer mirror having a thin-film type EC cell responsive to a negative voltage signal for increasing the reflectivity of the outer mirror and responsive to a positive voltage signal for decreasing the reflectivity of the outer mirror;

a detector responsive to light intensity at the inner mirror for generating a first voltage signal having a value corresponding to the light intensity;

a driving circuit responsive to the value of the first voltage signal for generating a positive driving voltage having a value above a reference voltage at times when the intensity is above a certain level; and a control circuit responsive to the positive driving voltage for varying the reflectivity of the outer mirror in accordance with the detected light intensity of the inner mirror.

2. The control device as claimed in claim 1, wherein said control circuit is responsive to the positive driving voltage for generating a positive voltage at times when the positive driving voltage is above the reference voltage and for generating a negative voltage when the positive driving voltage is below the reference voltage.

3. The control device as claimed in claim 1, wherein said control circuit is responsive to the positive driving voltage for generating a positive voltage that is proportional to the positive driving voltage at times when the positive driving voltage is above the reference voltage and for generating a negative voltage when the positive driving voltage is below the reference voltage.

4. The control device as claimed in claim 1, wherein said control circuit is responsive to the positive driving voltage for generating a positive voltage equal to the positive driving voltage at times when the positive driving voltage is above the reference voltage and for generating a negative voltage when the positive driving voltage is below the reference voltage.

5. The control device as claimed in claim 1, wherein the positive driving voltage has a maximum and minimum level and said control circuit is responsive to the positive driving voltage for generating a positive voltage at times when the positive driving voltage is at the maximum level and for generating a negative voltage at times when the positive driving voltage is at the minimum level.

\* \* \* \* \*